(12) United States Patent
Sherman

(10) Patent No.: US 6,863,028 B2
(45) Date of Patent: Mar. 8, 2005

(54) TIDAL IRRIGATION AND ELECTRICAL SYSTEM (TIES)

(76) Inventor: Martin T. Sherman, 6a Silesia Buildings, London, E8 3PX (GB)

( * ) Notice: Subject to any disclaimer, the term of this patent is extended or adjusted under 35 U.S.C. 154(b) by 0 days.

(21) Appl. No.: 10/401,205

(22) Filed: Mar. 27, 2003

(65) Prior Publication Data

US 2004/0022584 A1 Feb. 5, 2004

Related U.S. Application Data

(63) Continuation-in-part of application No. 09/810,128, filed on Mar. 19, 2001, now abandoned.

(51) Int. Cl.$^7$ .............................. A01K 61/00; F03G 7/04
(52) U.S. Cl. ......................... 119/211; 119/212; 60/497; 60/641.7
(58) Field of Search ................................ 60/497, 641.7; 119/211, 212, 230, 231; 165/45; 417/331

(56) References Cited

U.S. PATENT DOCUMENTS

| 3,473,509 A | * | 10/1969 | Mitsutake ................... 119/205 |
| 4,055,145 A | | 10/1977 | Mager et al. .................. 119/2 |
| 4,446,025 A | * | 5/1984 | Assaf et al. ................. 210/602 |
| 5,513,494 A | | 5/1996 | Flynn et al. ............... 60/641.7 |
| 5,701,740 A | | 12/1997 | Tveter ......................... 60/505 |

OTHER PUBLICATIONS

"Ocean Temperature Difference Power Generation Method", Japanese Patent Abstract JP402125975A, published May 14, 1990.

* cited by examiner

Primary Examiner—Sunil Singh
(74) Attorney, Agent, or Firm—Andrus, Sceales, Starke & Sawall, LLP

(57) ABSTRACT

A tidal irrigation and electrical system used to harness the power of the ocean tide to generate electricity, create sustainable aquaculture, act as a $CO_2$ sink, and generate hydrocarbons. An artificial atoll is created on the continental shelf to define a lagoon completely isolated from the surrounding ocean. As the tides rise and fall, the natural tidal action draws nutrient-rich, cold seawater into the lagoon to stimulate the growth of biolife. As the ocean tide falls, the natural tidal action draws the lagoon water out of the lagoon and through a biofilter to remove the biolife prior to discharge of the water back to the ocean.

24 Claims, 4 Drawing Sheets

TIDAL IRRIGATION AND ELECTRICAL SYSTEM (TIES)

CROSS-REFERENCE TO RELATED APPLICATIONS

The present invention is a continuation-in-part application of prior application U.S. Ser. No. 09/810,128, filed on Mar. 19, 2001, now abandoned.

BACKGROUND OF THE INVENTION

The present invention generally relates to a system and method for harnessing the natural tides of the ocean, in combination with an artificial atoll, to create a sustainable aquaculture and generate both electricity and a supply of biomass that can be harvested. More specifically, the present invention relates to a method and system of creating an artificial atoll on the continental shelf and utilizing the rising and falling tides of the surrounding ocean to create a natural pump to draw nutrient-rich, cold seawater from the ocean into an enclosed lagoon to stimulate the growth of biomass and generate electricity.

Presently, the world is suffering from a shortage of sustainable energy. Many people have tried to use aspects of the vast potential energy of the ocean but have failed to come up with an economically viable system. One such system, referred to as OTEC (ocean thermal energy conversion), which utilizes cold water to generate electricity, has been plagued by storm damage. Additionally, the efficiency of the OTEC system has been limited by the fact that a substantial amount of the energy developed is used in bringing up the denser water from below the ocean surface.

An example of such system is shown in the Mager U.S. Pat. No. 4,055,145. In the '145 patent, an OTEC plant having a pump draws nutrient-rich seawater from a depth of about 500 meters. The cold, deep seawater, in combination with warm surface seawater, is used to drive an OTEC power plant in a manner that is well known. In the '145 patent, the cold seawater is discharged into a natural atoll and the nutrients within the cold seawater are used to enhance the growth of biological life, such as shrimp, contained within the natural atoll.

According to the '145 patent, the marine life can be harvested from within the naturally occurring atoll. In the specific example identified in the '145 patent, the atoll is a naturally occurring coral island that is not completely enclosed. Thus, seawater is able to flow into and out of the atoll, which allows the water in the lagoon to rise and fall with the tides.

In addition to using an OTEC system, other tidal energy harnessing systems have been developed, such as in U.S. Pat. No. 5,701,740 and Japanese Patent No. JP 40 212 5975. These systems utilize the natural rising and falling of the ocean tides to perform some type of work and thus harness the energy inherent in the tide movements.

Although the prior art systems attempt to harness the available energy within the ocean, the currently available schemes have generally failed due to the ecological damage caused and the high cost typically involved in the systems. Therefore, a need exists for a system that utilizes the power available within the ocean to both generate electricity and sustain a biomass aquaculture that can be harvested to provide additional sources of either energy or food.

SUMMARY OF THE INVENTION

The present invention is a system to harness the power of the tide and generate electricity, create a sustainable aquaculture by utilizing nutrient-rich cold seawater and generate hydrocarbons, all the while furnishing a $CO_2$ sink. The system of the present invention utilizes an artificially created atoll on the continental shelf to define an enclosed inner lagoon separated from the ocean surrounding the atoll.

Preferably, the artificial atoll is created by dredging the ocean floor at or near the continental shelf. The dredged ocean floor is used to create an outer wall that defines the atoll. The outer wall forming the atoll is generally devoid of cracks and fissures such that the supply of water contained within the lagoon is isolated from the surrounding ocean.

An inflow pipe extends between the inner lagoon of the atoll and the ocean such that seawater can be drawn into the isolated lagoon as the ocean tides rise. Preferably, the inflow pipe has an inlet end that extends sufficiently deep into the ocean such that the inlet end receives a nutrient-rich supply of cold seawater. Preferably, the inlet end of the inflow pipe extends at least 600 meters below the ocean surface.

As the ocean tides rise, cold seawater is drawn into the lagoon through the inflow pipe. Preferably, an inflow turbine is positioned within the inflow pipe such that the flow of cold seawater rotates the inflow turbine to generate a supply of electricity. The supply of electricity created by the inflow turbine can be used to operate other components within the system of the present invention or exported.

The system further includes a water outflow pipe positioned between the water contained within the lagoon and the ocean. When the ocean tides fall, water is drawn from the inner lagoon through the outflow pipe and deposited back to the ocean. The drawn flow of water from within the lagoon allows the lagoon to rise and fall in concert with ocean tides.

In accordance with the invention, an outflow turbine is positioned within the outflow pipe such that the outflow turbine rotates to generate a supply of electricity as water is being drawn from within the lagoon. The electricity created by the outflow of turbine can be used in different manners within the system of the present invention or exported.

In accordance with the present invention, a supply of biolife is supplied into the water within the inner lagoon. The supply of biolife can include microscopic plant and animal life, typically referred to as plankton. When the nutrient-rich, cold seawater is fed into the lagoon due to the rising tide, the nutrient-rich seawater stimulates the growth of the biolife. The growth of the biolife acts as a $CO_2$ sink and generates carbon credits that can be sold on the open market.

When the ocean tide falls, the supply of lagoon water including the biolife is drawn through the outflow pipe. Preferably, a biofilter is positioned within the outflow pipe and is used to filter out the biolife as the water is being discharged back into the ocean. The separated biolife can then be sent to a processing plant for conversion into useful articles, such as alcohol, petrochemicals, fertilizers, protein and many other substances.

In addition to the inflow turbine, the water inflow pipe can also supply the cold seawater to an OTEC turbine. In the system of the invention, the inflow and outflow turbines generate electricity to drive a pump for the OTEC turbine, thereby overcoming the inefficiencies of the prior art OTEC systems. The OTEC turbine draws in a supply of warm seawater and generates electricity in a known manner. The electricity generated by the OTEC turbine can again be used to supply electricity that can be sold to generate operating profits.

As can be understood, the present invention creates an artificial atoll having an outer wall generally devoid of fissures and cracks such that the artificial atoll defines an inner lagoon that is isolated from the outside ocean except for through an inflow pipe and an outflow pipe. Thus, the rising and falling of the ocean tides creates a pumping effect to draw cold seawater into the lagoon and discharge water from the lagoon back to the ocean. The use of the rising and falling ocean tides both generates electricity and creates a supply of biomass. Further, the stimulated growth of biolife within the lagoon creates a $CO_2$ sink which creates a source of carbon credits that can be sold over the open market.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
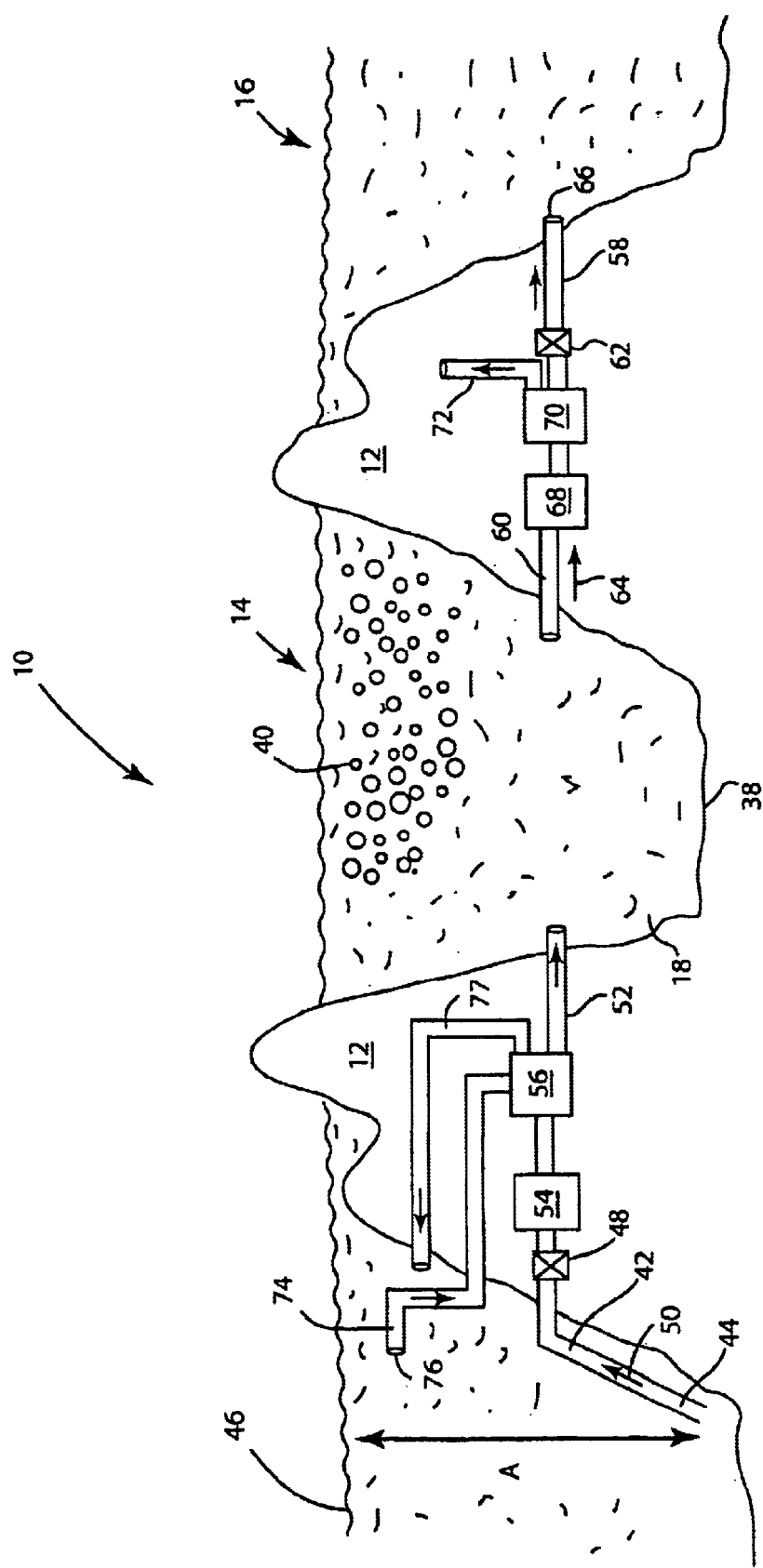
FIG. 1 is an overview schematic in block diagram form illustrating the system for tidal irrigation and the generation of electricity and biomass in accordance with the present invention.
Figure 2:
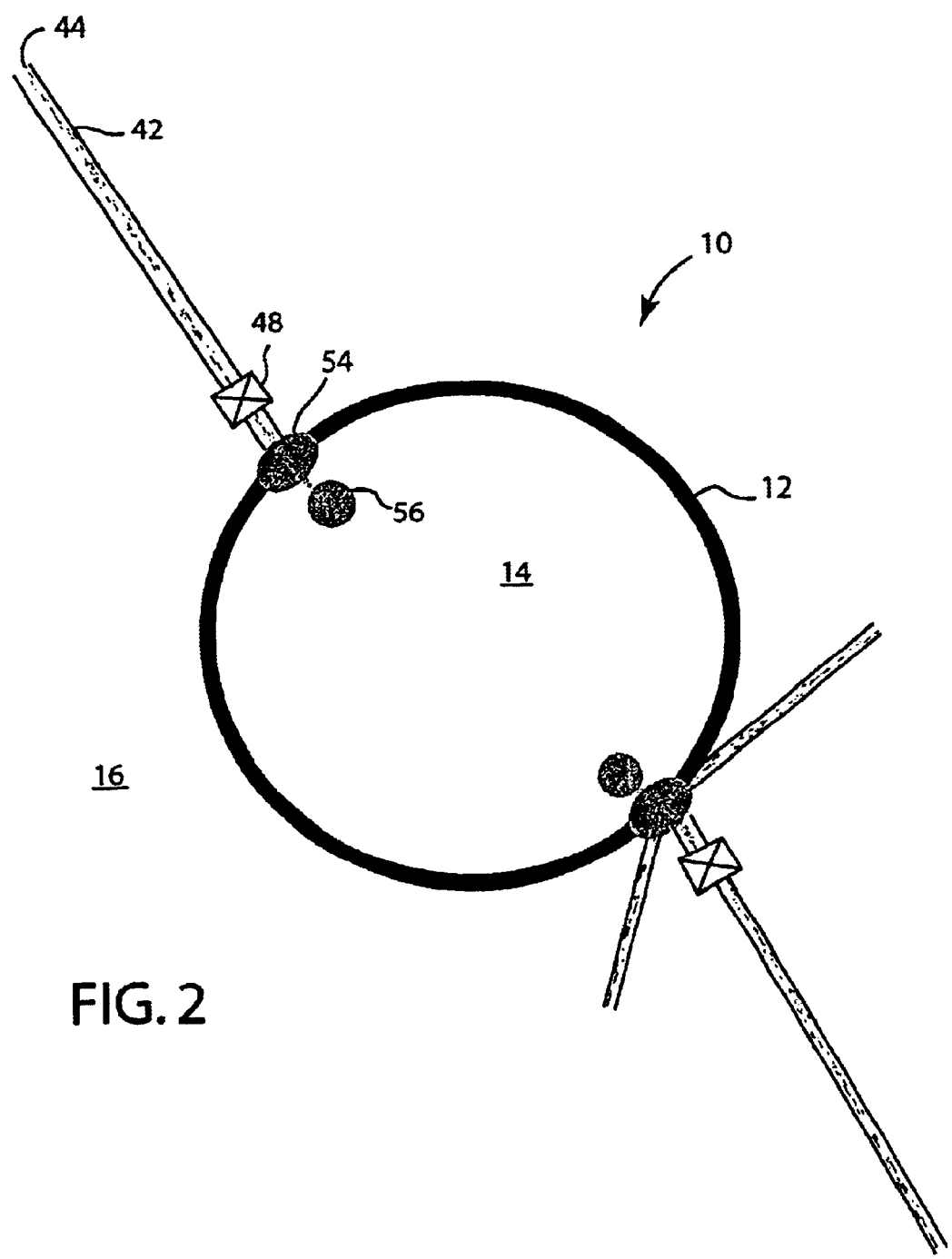
FIG. 2 is a top view of the system of the present invention.

Referring first to FIG. 1, thereshown is a atoll 10 that forms the basis of the present invention. As illustrated in FIG. 2, the atoll 10 is generally ring-shaped and defined by a continuous outer wall 12. The atoll 10 defines an inner lagoon 14 that is separated from the ocean 16 by the continuous outer wall 12. Because the inner lagoon 14 is separated from the surrounding ocean 16, the inner lagoon 14 includes an enclosed supply of lagoon water 18 whose level is unable to rise and fall with the rising and falling tides of the ocean 16 located to the exterior of the continuous outer wall 12.

In accordance with the present invention, the atoll 10 is artificially manufactured at or near the continental shelf and is thus away from coastal land masses whose coastal margins are presently the most utilized, expensive and endangered environments. However, the continental shelf is an under-utilized area that can be easily utilized without violating many currently in place international treaties.

Figure 3:
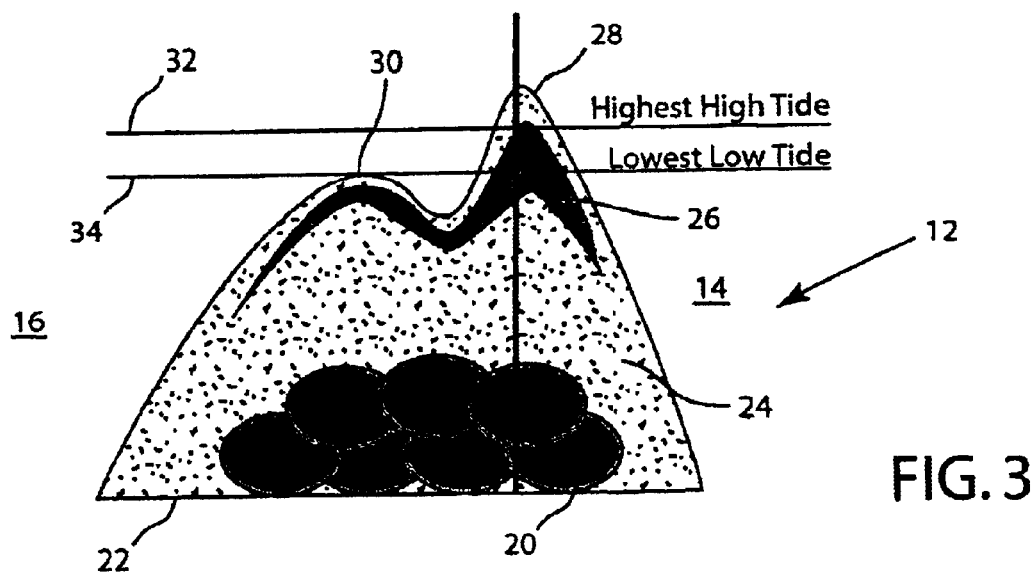
FIG. 3 is a section view taken through the outer wall of the artificial atoll constructed in accordance with the present invention.

Referring now to FIG. 3, the artificial atoll 10 of the present invention includes the continuous outer wall 12 that defines the enclosed inner lagoon 14. In the preferred embodiment of the invention, it is envisioned that the radius of the outer wall 12 will be in the range of 10–20 kilometers. However, other sizes for the artificial atoll are contemplated as being within the scope of the present invention.

Referring back to FIG. 3, thereshown is a section view through the continuous outer wall 12. In the embodiment illustrated, the continuous outer wall includes a base layer 20. The base layer 20 can be formed from landfill material to help anchor the atoll 10 in position along the ocean floor. For example, the base layer 20 could be formed from landfill material brought to the location and positioned on the ocean floor 22. It is contemplated by the inventor that the base layer 20 would most likely be obtained from a location other than the continental shelf.

Once the base layer 20 is in place, an outer layer 24 is developed over the base layer 20. The outer layer 24 defines a majority of the outer wall 12 and is preferably obtained by dredging the ocean floor of the continental shelf. Thus, the outer layer 24 will typically be formed from dredged sand and shell material available on the floor of the continental shelf. The use of sand and shell material to develop the outer layer 24 will result in the outer layer 24 being generally devoid of fissures and cracks that would allow seawater to pass from the inner lagoon 14 to the ocean 16, as illustrated in FIG. 1. The importance of the outer wall 12 being semi-impermeable and devoid of fissures and cracks will be set forth in much greater detail below.

Referring back to FIG. 3, the outer wall 12 can preferably also include a top layer 26. The top layer 26 is formed from clay and provides additional support and impermeability to the entire outer wall 12. However, the use of the top layer 26 is not required to operate within the scope of the present invention. As can be understood, utilization of the top layer 26 will require additional material to be brought to the artificial atoll 12 from a remote location.

As illustrated in FIG. 3, the outer wall 12 includes a first peak 28 and a second peak 30 in the preferred embodiment of the invention. The second peak 30 is below the first peak 28. As illustrated in FIG. 3, the first peak 28 extends above the highest high tide water level 32 to prevent the ocean seawater from entering into the inner lagoon defined by the outer wall 12. The second peak 30 is constructed such that the second peak is approximately at sea level when the seawater is at the low tide point 34. The second peak 30 is constructed to absorb excess wave energy from the ocean 16 to the exterior of the outer wall 12, as illustrated. Thus, the second peak 30 is able to deflect much of the wave energy such that the wave energy is dissipated before it reaches the first peak 28.

Figure 4:
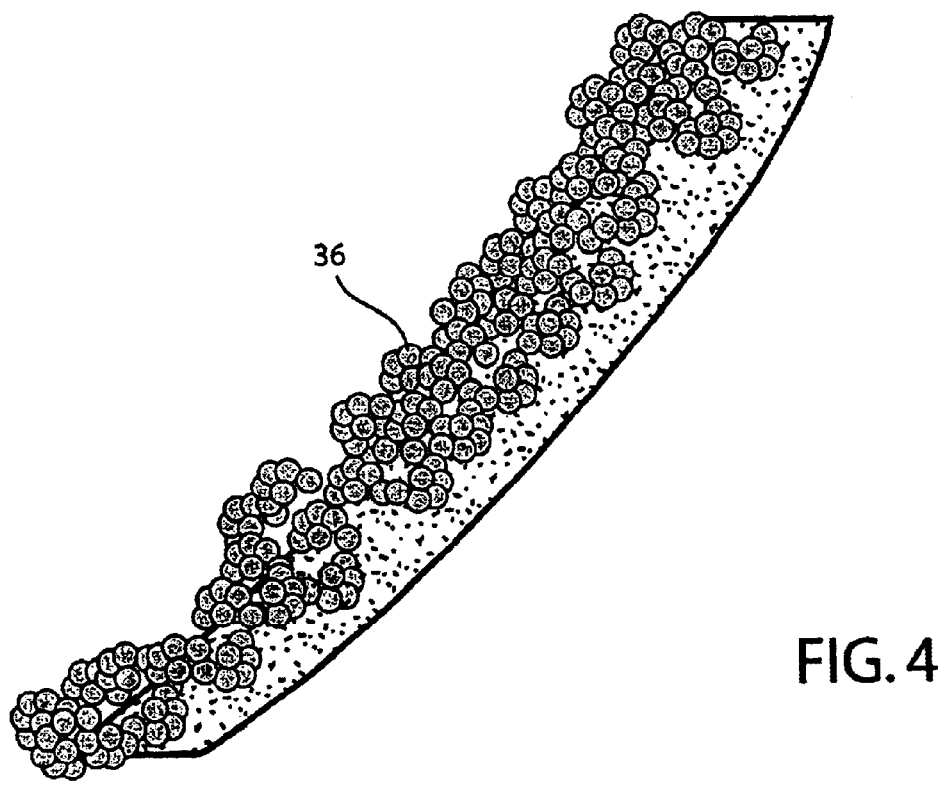
FIG. 4 is a detailed view of the outer wall of the atoll.

Referring now to FIG. 4, thereshown is a cross-section view of the outer wall of the artificial atoll of the present invention. As illustrated, a supply of plant life 36 is planted on the side of the outer wall facing the inner lagoon 14. The plant life provides additional stability for the outer wall 12. It is contemplated by the inventor that plant life, such as mangroves, can be planted on the portions of the outer wall that extend above sea level to provide stability and additional nurseries for aquaculture contained within the inner lagoon 14.

As can be understood by the above description, the atoll 10 of the present invention is constructed artificially along the continental shelf to define the inner lagoon 14. It is important to note that the atoll 10 is constructed with an outer wall formed primarily from dredged material available at the continental shelf. The outer wall is generally devoid of fissures and cracks such that the lagoon water 18 contained within the lagoon 14 is isolated from the seawater contained within the ocean 16 on the opposite side of the outer wall 12. Thus, as the ocean tides rise and fall, the inner lagoon water 18 remains isolated from the ocean 16.

As illustrated in FIG. 1, the lagoon 14 has a floor 38 that defines the depth of the lagoon 14. In accordance with the present invention, there is no maximum depth for the lagoon 14. However, the minimum depth for the lagoon 14 should be at least one-third of the tidal exchange to be discussed in detail below.

Once the atoll 10 has been created, the lagoon 14 is supplied with a source of biolife. In accordance with the present invention, the biolife can take many different forms. However, it is contemplated by the inventor that the biolife can include both plant and animal organisms, such as plankton and other microscopic life forms. The biolife is shown in FIG. 1 and represented by reference numeral 40. As is well understood, the biolife 40, such as plankton, reproduces and grows rather poorly in normally tropic waters, since these waters are typically devoid of the required nutrients necessary to maintain plant life. However, in accordance with the present invention, a supply of nutrients will be introduced into the inner lagoon 14 to stimulate and promote the growth and reproduction of the supply of biolife.

Referring now to FIG. 1, the system of the present invention utilizes a cold water inflow pipe 42 having an inlet end 44 extending well below the ocean surface 46. The inlet end 44 extends below the ocean surface such that it reaches a supply of nutrient-rich, cold seawater. Typically, the inlet end 44 will extend a selected distance A below the ocean surface 46 to where water having the desired nutrients and temperature are available. For example, the inlet end 44 may extend at least 600 meters below the surface 46 to obtain ocean water having extremely fertile nutrients. Water at 600 meters below the ocean surface 46 typically has a temperature of approximately 2° C.

As illustrated in FIG. 1, the inflow pipe 42 includes an inlet valve 48 that allows the seawater to flow only in the direction illustrated by arrow 50. Typically, the inlet valve 48 is a simple check valve that allows flow in only one direction.

The inflow pipe 42 is connected to a discharge pipe 52 through an inflow turbine 54 and an OTEC turbine 56. As illustrated, the discharge pipe 52 supplies the cold seawater into the lagoon 14.

As can be understood by the previous description, when the ocean tide is rising, the ocean surface 46 rises along the outer wall 12 of the artificial atoll 10. However, since the supply of lagoon water 18 is completely isolated from the ocean 16 because the outer wall 12 includes no fissures or cracks, the tidal flux will draw a supply of ocean water into the lagoon 14 through the combination of the inlet pipe 42 and the discharge pipe 52. The action of the tidal flux thus acts as a naturally occurring pump to draw the nutrient-rich, cold sea located near the inlet end 44 of the inlet pipe 42 into the otherwise enclosed lagoon 14.

As the flow of water, illustrated by arrow 50, passes through the inlet pipe 42, the flow of cold seawater enters into the inflow turbine 54. The inflow turbine 54 is constructed to have a vane or similar structure that rotates in the flow of cold seawater. The rotating vane or similar structure is coupled to an electricity generator such that the flow of water generates electricity.

After the cold seawater has passed through the inflow turbine 54, the seawater is discharged into the lagoon 14. As discussed previously, the seawater being discharged into the lagoon is very rich in nutrients. The nutrient-rich cold seawater entering the lagoon 14 stimulates the growth of the biolife 40 included within the lagoon 14. In this manner, the natural action of the rising and falling ocean tide will not only generate electricity, but will act as a natural pump to supply cold seawater to the lagoon to stimulate the growth of the biolife 40.

Referring back to FIG. 1, the system of the present invention further includes a water outflow pipe 58 that allows the inner lagoon 14 to drain as the ocean tide falls. In the same manner as discussed previously, when the ocean tide falls, the water within the lagoon has nowhere to go due to the continuous outer wall 12 that has generally no cracks or fissures. Thus, the outflow pipe 58, which is coupled to a discharge pipe 60, provides a path for the lagoon water 18 to exit the lagoon 14. An outlet valve 62 is positioned to allow the flow of water in only the direction shown by arrows 64. Thus, when the ocean tide is falling, the tidal flux creates a natural pumping action that draws the lagoon water 18 out of the lagoon 14 and discharges the water into the ocean at the outlet end 66 of the outflow pipe 58.

Figure 5:
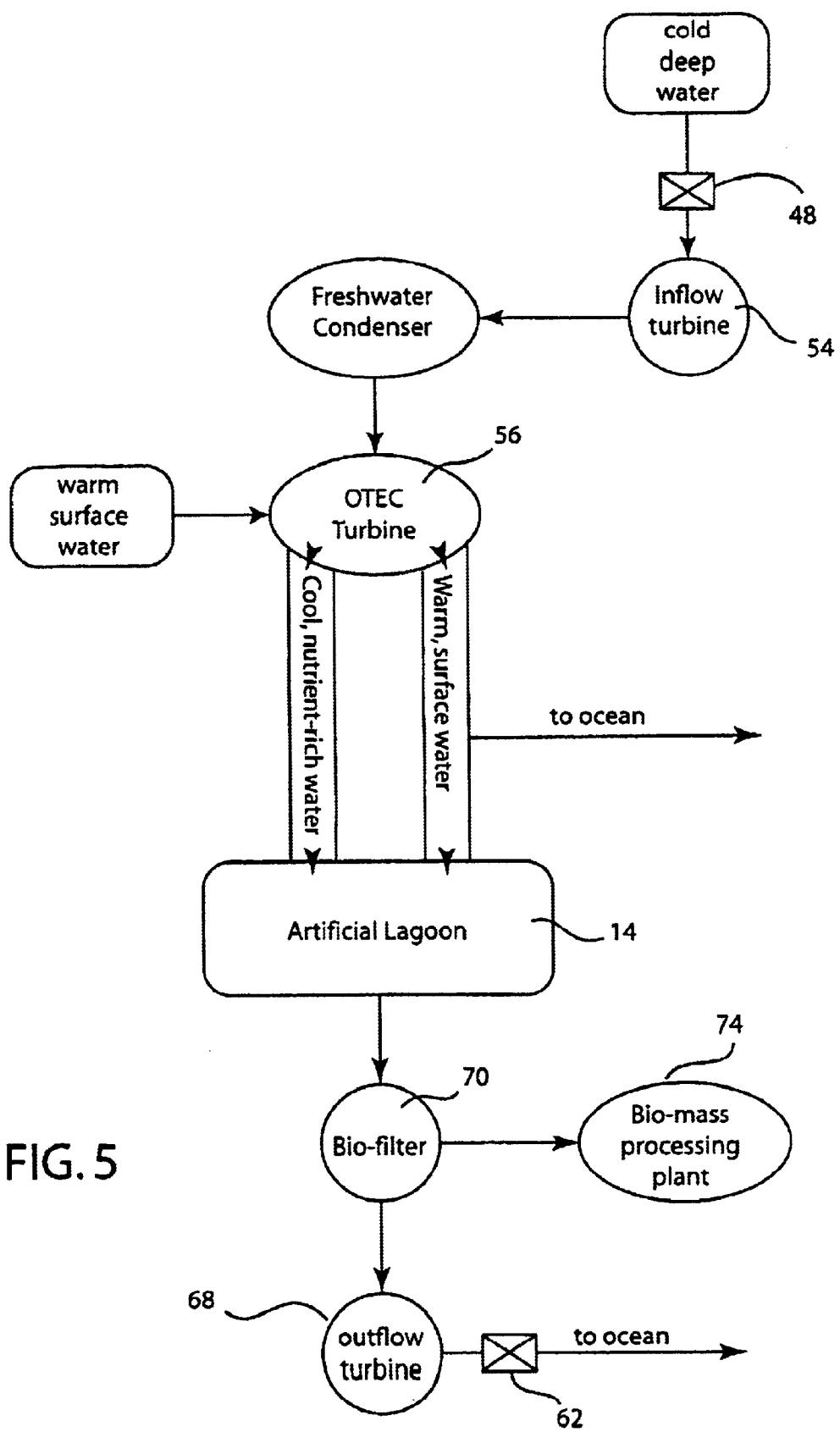
FIG. 5 is a flowchart illustrating the movement of water through the system of the present invention.

As illustrated in FIGS. 1 and 5, an outflow turbine 68 is positioned to receive the flow of water leaving the lagoon 14. As with the inflow turbine 54, the outflow turbine 68 includes a vane or similar structure that rotates due to the flow of water within the outflow pipe 58. The vane or similar structure is connected to an electricity-generating appliance such that the outflow turbine 68 creates a supply of electricity. The supply of electricity can be used for any number of applications in the system of the present invention.

In addition to the outflow turbine 68, the discharge portion of the system includes a biofilter 70. As previously described, the lagoon water 18 includes a healthy population of biolife whose growth is stimulated by the nutrient-rich, cold seawater introduced through the discharge pipe 52. Although the biolife 40 is being grown and developed within the lagoon 14, the biolife must be removed to promote further growth and prevent eutrification and excess uncontrolled methane production, as well as low oxygen environments and resulting in fish kills due to the decay of organic material. The biofilter 70 can be placed in the outflowing water and used to collect the biomass 40. Preferably, the biofilter 70 is a simple filtering device that removes the biomass from the exiting lagoon water and directs the biomass through an outlet 72 to a biomass processing plant 74, as illustrated in FIG. 5. The biomass processing plant can either be at or near the artificial atoll or can be located in a remote location. The biomass processing plant can perform many functions, including the fermentation of the biomass for creating traditional fuels based on anaerobic reactions. Alternatively, the biomass developed can be utilized in any other manner as is known.

As understood in the description of FIGS. 1 and 5, the rising and falling ocean tides act as a pump to initially draw nutrient-rich, cold seawater into the lagoon 14 through the inflow pipe 42 and subsequently discharge lagoon water 18 back to the ocean through the outflow pipe 58. The natural flows of the water into and out of the isolated lagoon 14 are used to generate electricity through the use of an inflow turbine 54 and an outflow turbine 68. Additionally, the use of the nutrient-rich seawater stimulates growth of the biolife 40, which is removed from the lagoon with the biofilter 70. Thus, the entire system described utilizes only the tidal flux to both create electricity and generate a supply of biomass that can be used for additional purposes.

Referring back to FIGS. 1 and 5, the system of the present invention preferably includes an OTEC turbine 56 positioned in series with the inflow turbine 54. The OTEC turbine 56 receives a supply of warm surface water through an inlet pipe 74 having its inlet end 76 positioned near the ocean surface. Typically, an electricity-driven pump is used to draw the warm surface water through the inlet pipe 74 into the OTEC turbine 56. Within the OTEC turbine 56, the cold seawater drawn through the inflow pipe 42 and the warm surface water from the inlet pipe 74 are utilized in a conventional manner to generate electricity based upon the thermal difference between the two supplies of water. Once such electricity is developed, the cold seawater is discharged into lagoon 14 through the discharge pipe 52, while the warm seawater is returned back to the ocean through a discharge pipe 77.

In accordance with the present invention, the biomass created and removed from the system by using the biofilter 70 can be used for many different applications. For example, the biomass can be converted into alcohol, petrochemicals, fertilizers, protein and many other useful substances. In addition to being used for other end purposes, the growth and development of the biolife 40 within the lagoon 14 functions as a $CO_2$ sink. Under many international and worldwide organizational treaties, the development of a $CO_2$ sink allows the owner of the system to acquire carbon credits. Further carbon credits are created by the amount of biolife that flows past the biofilter 70 and into the ocean. These carbon credits can be sold to other types of organizations that generate excessive $CO_2$ and thus may be subject to fines or sanctions. These organizations can purchase carbon credits from organizations developing a surplus, such as through the use of the system of the present invention.

In accordance with the present invention, the size of the artificial atoll 10 of the present invention can vary and has no upper or lower limit. However, the proportion of volume through circumference goes up as the circumference is increased. For example, an artificial atoll having a radius of 2 km has a circumference of 12.566 km and a surface area of 12.566 $km^2$. Further, an artificial atoll 10 with a radius of 10 km has a circumference of 62.83 km and a surface area of 31,415 $km^2$. Based on a rough projection, 16.5 million $m^3$ of material will be needed to put in place at 20 m deep to construct an artificial atoll 10 with a radius of 10 km. Such an artificial atoll could be developed using continuous material placement in approximately seven months.

Once the artificial atoll 10 has been created, an atoll with a radius of 2 km with an average tidal exchange of two meters has a daily volume exchange of 50,264 $m^3$ and has a daily electrical output of around 12,357 kW/hr. off of tidal energy alone. An artificial atoll having a 10 km radius would generate approximately 31 gW/hr. of tidal electricity. Power output from the OTEC turbine 56 and the amount of biomass generated is also dependent upon the size and many other additional factors.

Various alternatives and embodiments are contemplated as being within the scope of the following claims particularly pointing out and distinctly claiming the subject matter regarded as the invention.

I claim:

1. A system of tidal irrigation to create a sustainable aquaculture and generate biomass, the system comprising:
   an artificially created atoll created on the continental shelf, the atoll having a continuous outer wall extending above sea level to form an inner lagoon isolated from the surrounding ocean, the outer wall being generally devoid of fissures such that ocean water is prevented from entering the inner lagoon through the outer wall, the lagoon including a supply of lagoon water stocked with a supply of biolife;
   a water inflow pipe extending between the inner lagoon and the ocean, wherein the inflow pipe includes an inlet end extending a selected distance below sea level to access nutrient-rich, cold seawater, the water inflow pipe including an inlet valve to prevent the lagoon water from flowing from the lagoon into the ocean through the inflow pipe, wherein a rise in the tidal flux draws the nutrient-rich, cold seawater into the lagoon through the water inflow pipe;
   a water outflow pipe extending between the inner lagoon and the ocean, wherein the water outflow pipe includes an outlet valve to prevent ocean water from flowing into the inner lagoon from the ocean through the outflow pipe, wherein a fall in the tidal flux draws the lagoon water from the lagoon out into the ocean through the outflow pipe; and
   a biofilter positioned in the outflow pipe to remove the biolife from the lagoon water as the lagoon water is drawn from the inner lagoon by the falling tidal flux.

2. The system of claim 1 wherein the outer wall of the artificial atoll includes a base layer and an outer layer, wherein the outer layer is formed from dredged sand and shell material from the continental shelf.

3. The system of claim 2 wherein the base layer is formed from landfill not obtained from the continental shelf.

4. The system of claim 1 wherein the inlet end of the inflow pipe is positioned at least 600 meters below sea level.

5. The system of claim 1 further comprising an inflow turbine positioned between the inflow pipe and the inner lagoon, wherein when the tidal flux draws ocean water into the inner lagoon, the inflow turbine rotates to generate electricity.

6. The system of claim 5 further comprising an outflow turbine positioned between the inner lagoon and the outflow pipe, wherein when the tidal flux draws lagoon water out of the inner lagoon, the outflow turbine rotates to generate electricity.

7. The system of claim 6 further comprising an OTEC turbine positioned to receive the nutrient-rich, cold seawater in the inflow pipe and generate electricity based upon the temperature gradient developed by the cold seawater.

8. The system of claim 1 further comprising an outflow turbine positioned between the inner lagoon and the outflow pipe, wherein when the tidal flux draws lagoon water out of the inner lagoon, the outflow turbine rotates to generate electricity.

9. The system of claim 1 wherein the outer wall includes a first peak and a second peak, the first peak extending above the second peak and being positioned to define the inner lagoon.

10. The system of claim 9 wherein the second peak extends only to sea level at low tide, wherein the second peak is constructed to absorb wave energy from the ocean.

11. The system of claim 1 further comprising an OTEC turbine positioned to receive the nutrient-rich, cold seawater in the inflow pipe and generate electricity based upon the temperature gradient developed by the cold seawater.

12. A method of tidal irrigation to create a sustainable aquaculture and generate biomass and electricity, the method comprising the steps of:
   dredging the ocean floor near the continental shelf to artificially create an atoll, the atoll having a continuous outer wall extending above sea level to prevent ocean water from passing through the outer wall, wherein the atoll defines an inner lagoon enclosing a supply of lagoon water isolated from the ocean water surrounding the atoll;
   introducing a supply of biolife into the lagoon water;
   positioning an inflow pipe between the supply of lagoon water and the ocean, the inflow pipe having an inlet end extending a selected distance below sea level to access nutrient-rich, cold seawater;
   allowing cold seawater to be drawn into the lagoon through the inlet pipe due to the tidal flux created by the rising ocean tide;

positioning an outflow pipe between the supply of lagoon water and the ocean;

allowing the supply of lagoon water to be drawn out of the lagoon through the outflow pipe due to the tidal flux created by the falling ocean tide; and removing the biolife from the supply of lagoon water as the lagoon water is being drawn through the outflow pipe.

13. The method of claim 12 wherein the step of forming the atoll includes the steps of:

depositing a base layer of material on the ocean floor, the base layer being obtained from a location away from the continental shelf; and dredging the ocean floor near the continental shelf to deposit an outer layer on the base layer to define the outer wall, wherein the outer wall is generally devoid of fissures such that the lagoon water is isolated from the seawater.

14. The method of claim 12 further comprising the step of positioning an inflow turbine in the inflow pipe such that the inflow turbine rotates under the influence of the inflow of water through the inflow pipe to generate electricity.

15. The method of claim 14 further comprising the step of positioning an outflow turbine in the outflow pipe such that the outflow turbine rotates under the influence of the outflow of water through the outflow pipe to generate electricity.

16. The method of claim 14 further comprising the step of positioning an OTEC turbine in the inflow pipe to generate electricity based on the thermal gradient developed by the cold seawater.

17. The method of claim 12 further comprising the step of positioning an outflow turbine in the outflow pipe such that the outflow turbine rotates under the influence of the outflow of water through the outflow pipe to generate electricity.

18. The method of claim 17 wherein the step of removing the biolife includes filtering the biolife from the lagoon water with a biofilter as the lagoon water is being drawn through the outflow pipe by the tidal flux created by the falling ocean tide.

19. The method of claim 18 further comprising the steps of:

calculating the number of carbon credits based on the amount of biolife in the lagoon water; and selling the carbon credits to a purchaser.

20. The method of claim 12 further comprising the step of preventing the flow of lagoon water out of the inflow pipe and preventing the flow of seawater into the lagoon through the outflow pipe.

21. A system of tidal irrigation to create a sustainable aquaculture and generate biomass, the system comprising:

an artificially created atoll created on the continental shelf, the atoll having a continuous outer wall extending above sea level to form an inner lagoon isolated from the surrounding ocean, the outer wall being generally devoid of fissures such that ocean water is prevented from entering the inner lagoon through the outer wall, the lagoon including a supply of lagoon water stocked with a supply of biolife;

a water inflow pipe extending between the inner lagoon and the ocean, wherein the inflow pipe includes an inlet end extending a selected distance below sea level to access nutrient-rich, cold seawater, the water inflow pipe including an inlet valve to prevent the lagoon water from flowing from the lagoon into the ocean through the inflow pipe, wherein a rise in the tidal flux draws the nutrient-rich, cold seawater into the lagoon through the water inflow pipe;

a water outflow pipe extending between the inner lagoon and the ocean, wherein the water outflow pipe includes an outlet valve to prevent ocean water from flowing into the inner lagoon from the ocean through the outflow pipe, wherein a fall in the tidal flux draws the lagoon water from the lagoon out into the ocean through the outflow pipe;

an inflow turbine positioned between the inflow pipe and the inner lagoon, wherein when the tidal flux draws ocean water into the inner lagoon, the inflow turbine rotates to generate electricity; and an outflow turbine positioned between the inner lagoon and the outflow pipe, wherein when the tidal flux draws lagoon water out of the inner lagoon, the outflow turbine rotates to generate electricity.

22. The system of claim 21 further comprising an OTEC turbine positioned to receive the nutrient-rich, cold seawater in the inflow pipe and generate electricity based upon the temperature gradient developed by the cold seawater.

23. A method of tidal irrigation to create a sustainable aquaculture and generate biomass and electricity, the method comprising the steps of:

dredging the ocean floor near the continental shelf to artificially create an atoll, the atoll having a continuous outer wall extending above sea level, wherein the atoll defines an inner lagoon enclosing a supply of lagoon water isolated from the ocean water surrounding the atoll;

introducing a supply of biolife into the lagoon water;

positioning an inflow pipe between the supply of lagoon water and the ocean, the inflow pipe having an inlet end extending a selected distance below sea level to access nutrient-rich, cold seawater;

allowing cold seawater to be drawn into the lagoon through the inlet pipe due to the tidal flux created by the rising ocean tide;

positioning an outflow pipe between the supply of lagoon water and the ocean;

allowing the supply of lagoon water to be drawn out of the lagoon through the outflow pipe due to the tidal flux created by the falling ocean tide;

positioning an inflow turbine in the inflow pipe such that the inflow turbine rotates under the influence of the inflow water through the inflow pipe to generate electricity; and positioning an outflow turbine in the outflow pipe such that the outflow turbine rotates under the influence of the output of water through the outflow pipe to generate electricity.

24. The method of claim 23 further comprising the step of positioning an OTEC turbine in the inflow pipe to generate electricity based on the thermal gradient developed by the cold sea water.

* * * * *